United States Patent [19]
Hofsteenge

[11] Patent Number: 5,301,707
[45] Date of Patent: Apr. 12, 1994

[54] ANTI-WHISTLING DUCKBILL VALVE

[75] Inventor: Remko K. Hofsteenge, Hengelo, Netherlands

[73] Assignee: Vernay Laboratories, Inc., Yellow Springs, Ohio

[21] Appl. No.: 44,697

[22] Filed: Apr. 12, 1993

[51] Int. Cl.[5] .............................................. F16K 15/16
[52] U.S. Cl. ...................................... 137/12; 137/514; 137/846
[58] Field of Search .................. 137/846, 847, 514, 12

[56] References Cited

U.S. PATENT DOCUMENTS

| | | |
|---|---|---|
| 3,822,720 | 7/1974 | Souza . |
| 3,896,849 | 7/1975 | Ervin ................................ 137/847 |
| 4,341,239 | 7/1982 | Atkinson . |
| 4,612,960 | 9/1986 | Edwards et al. . |
| 5,010,925 | 4/1991 | Atkinson et al. . |

Primary Examiner—Robert G. Nilson
Attorney, Agent, or Firm—Biebel & French

[57] ABSTRACT

The present invention provides an anti-whistling duckbill check valve for use in a fluid flow path for permitting relatively free flow of fluid in the path in a first direction from a first to a second end of the valve and for preventing fluid flow in the path in a second opposite direction. The check valve includes first and second lips extending in converging relationship to each other from a base portion of the valve. A vibration dampening rib is located on each of the lips wherein the ribs are configured to have a natural frequency substantially equal to the lips. The ribs vibrate out of phase with the lips such that the vibration of the lips is dampened.

20 Claims, 3 Drawing Sheets

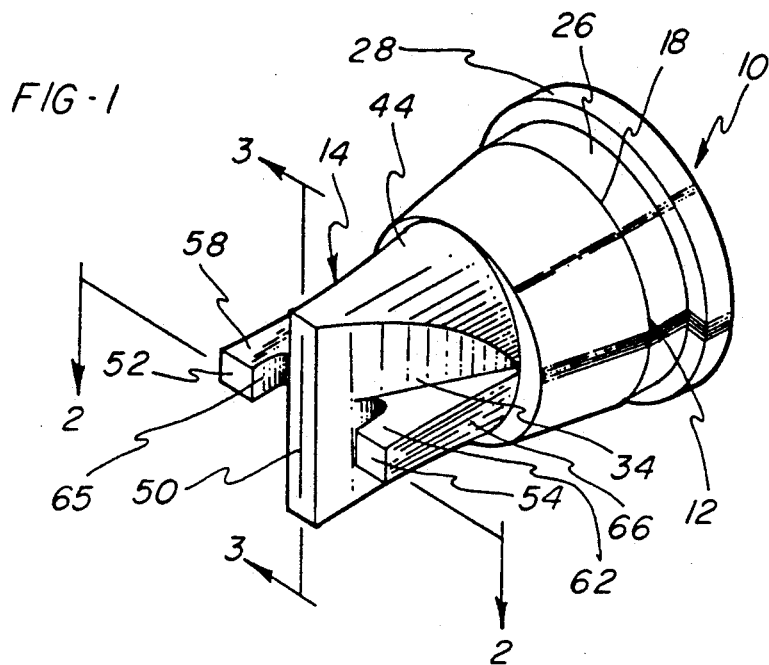
FIG-1
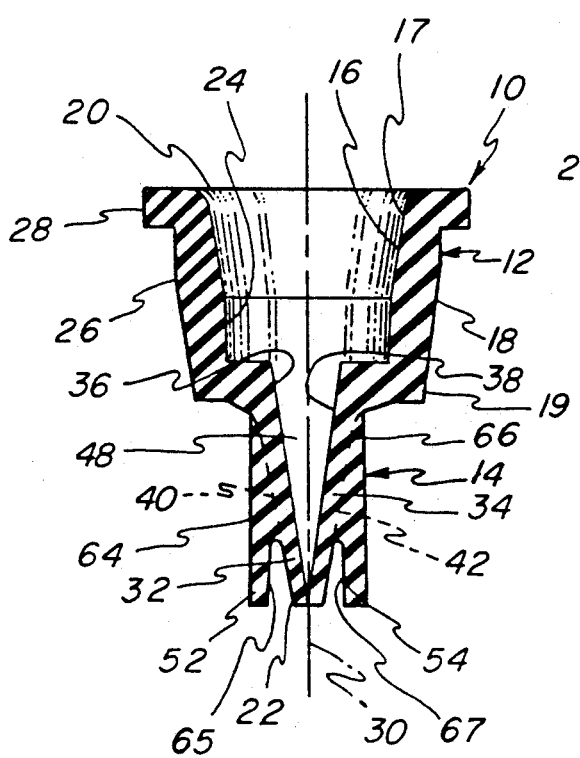
FIG-2
FIG-3

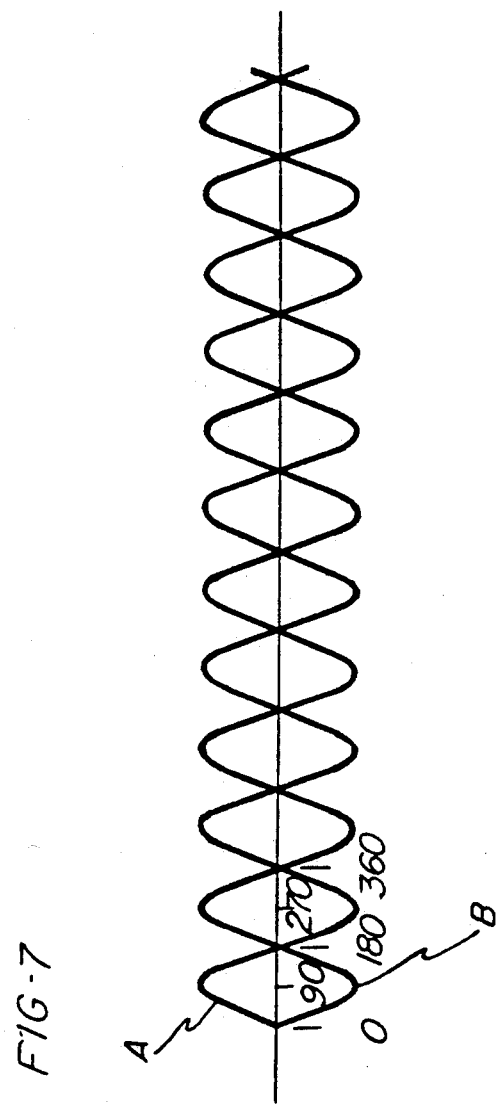

ANTI-WHISTLING DUCKBILL VALVE

BACKGROUND OF THE INVENTION

The present invention relates to a duckbill check valve for use in a flow path for permitting relatively free flow of fluid in the flow path in a first direction from a first to a second end of the check valve and for preventing fluid flow in the path in a second opposite direction. More particularly, the present invention relates to a duckbill check valve having a construction which limits the vibration of lips forming the valve in order to prevent the production of whistling sounds during fluid flow through the valve.

Duckbill valves are widely used to control fluid flow in a variety of devices. The structure of duckbill valves typically includes a pair of substantially planar lip portions which converge toward each other from a first to a second end of the valve. The lip portions are joined at lateral edges thereof by side walls such that the lip portions and side walls define a fluid flow path therethrough. The valve is typically formed of an elastomeric material and the lip portions are formed as thin highly flexible members which provide a low resistance to forward flow through the valve while producing a positive closing force for closing a slit at the second end of the valve to prevent reverse flow through the valve.

Due to the highly flexible structure of the lip portions, fluid flow through the valve at certain pressures and fluid flow rates results in the lip portions flexing in and out at a high rate to produce a vibration resulting in a high pitch tone or whistling noise. This noise is undesirable in many applications of the valve. For example, duckbill valves are frequently used to control fluid flow in fluid lines used in medical environments where it is undesirable to have fluid flow noise, and this problem is particularly evident when the valve operates to control flow of a gas therethrough.

Accordingly, there is a need for a valve which controls fluid flow in a desired direction and which does so without producing undesirable noise. In addition, there is a need for a valve which includes means for controlling noise related to vibrations of resilient portions of the valve in order to avoid production of noise during use of the valve.

SUMMARY OF THE INVENTION

The present invention provides an anti-whistling duckbill check valve for use in a fluid flow path for permitting relatively free flow of fluid in the path in a first direction from a first to a second end of the valve and for preventing fluid flow in the path in a second opposite direction.

In one aspect, the valve comprises a resilient valve body for controlling fluid flow, and a vibration dampener supported on the valve body for dampening a vibrating movement of the valve body during fluid flow past the valve.

In another aspect, the check valve includes a base portion defining a longitudinal axis for the valve. First and second lip portions are supported by the base portion and extend in converging relationship toward each other to form a fluid flow passage through the valve. A slit is defined at the second end of the valve to form an opening for permitting fluid flow out of the flow passage.

Vibration dampening means are located on each of the lip portions spaced from lateral edges thereof. The vibration dampening means may be in the form of ribs extending longitudinally along the lip portions wherein the depth of the ribs, as measured in a direction perpendicular to the slit, decreases at a substantially constant rate from the second end toward the first end of the valve.

The vibration dampening elements increase the mass of the lip portions to substantially alter the vibration characteristics thereof. In addition, the vibration dampening elements form vibrating members having a natural frequency substantially equal to and out of phase with the lip portions such that audible noise producing vibrations of the lip portions are cancelled out by vibrations of the dampening means.

Further, the vibration dampening elements control the movement of the lip portions without adversely affecting the beneficial characteristics of the duckbill valve including the ability to quickly open at low pressures, as well as provide a positive closure of the slit during reverse flow conditions.

Other objects and advantages of the invention will be apparent from the following description, the accompanying drawings, and the appended claims.

BRIEF DESCRIPTION OF THE DRAWINGS

FIG. 1 is a perspective view of the duckbill valve of the present invention;

FIG. 2 is an elevational cross-sectional view taken along line 2—2 in FIG. 1;

FIG. 3 is an elevational cross-sectional view taken along line 3—3 in FIG. 1;

FIG. 7 is a graphical representation of the frequency of oscillating movement for the lip portions and vibration dampening means of the valve.

DETAILED DESCRIPTION OF THE PREFERRED EMBODIMENT

Figure 4:
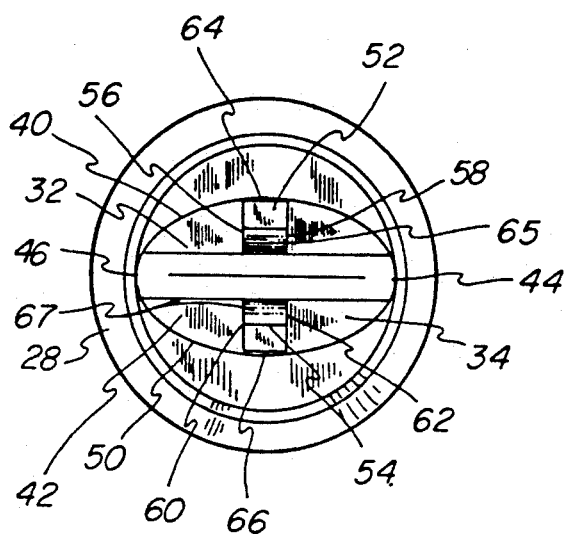
FIG. 4 is a plan view taken from the outlet end of the valve.

Referring to FIG. 1, the anti-whistling duckbill check valve 10 of the present invention is shown and includes a base portion 12 and a regulator portion 14. The base portion 12 is adapted to support the valve 10 in a fluid flow line and further provides a support structure for supporting the regulator portion 14.

Referring to FIGS. 2 and 3, the base portion is defined by inner and outer wall portions 16, 18 wherein each wall portion 16, 18 has a substantially circular cross-section which decreases in diameter from a first end 20 toward a second end 22 of the valve 10. In addition, the inner wall 16 is provided with a substantially cylindrical portion 24 which may facilitate attachment of the valve 10 to a fluid flow line, and the outer wall 18 is provided with a substantially cylindrical portion 26 which may facilitate mounting the outer portion of the valve 10 to an interior wall of a fluid flow line wherein adjacent tapered portions 17, 19 of the walls 16, 18 facilitate movement of the fluid flow lines into contact with the cylindrical portions 24, 26.

A flange 28 extends radially outwardly from the base portion 12 at the first end 20 of the valve for further facilitating mounting of the valve to a fluid line or support surface. The flange 28 is formed as an annular member and defines, along with the other base portion structure, a central longitudinal axis 30 for the valve 10.

Referring to FIGS. 2-4, the regulator portion 14 includes first and second lip portions 32, 34. The lip portions 32, 34 define respective substantially planar inner walls 36, 38 and substantially planar outer walls 40, 42 such that the lip portions 32, 34 are formed as substantially planar members.

The lip portions 32, 34 are joined by curved side walls 44, 46 which extend between lateral edges of the lip portions 32, 34 such that the lip portions 32, 34 and side walls 44, 46 define a fluid flow passage 48 through the valve 10. A slit 50 is formed between the lip portions 32, 34 at the second end 22 and provides an opening for permitting fluid flow out of the flow passage 48.

In the embodiment shown, the lip portions 32, 34 each have a thickness between respective inner and outer walls 36, 40 and 38, 42 which is less than approximately 1/20 of the width of the lip portions, as measured in a direction parallel to the direction of the length of the slit 50. Further, the lip portions 32, 34 and side walls 44, 46, as well as the base portion 12 is formed of an elastomeric material such that the lip portions 32, 34 are formed as resilient highly flexible members which permit easy opening of the slit 50 for forward flow of fluids through the flow passage 48 in a direction from the first end 20 to the second end 22 of the valve 10. The resilient lip portions 32, 34 also provide for positive closure of the slit 50 during reverse flow conditions.

As was noted above, the highly flexible nature of the lip portions of duckbill valves contributes to the vibration of the lip portions at a natural frequency during certain fluid flow conditions leading to the production of a whistling noise. In order to dampen and/or eliminate this vibration of the lip portions 32, 34, the valve of the present invention is provided with vibration dampening means in the form of first and second ribs 52, 54 which extend from an upstream location, for example adjacent to the base portion 12, toward a downstream location adjacent to the second end 22 of the valve 10.

As may be best seen in FIGS. 1, 2 and 4, each of the ribs 52, 54 are defined by opposing pairs of lateral walls 56, 58 and 60, 62 which are connected by respective connecting walls 64, 66. In addition, each of the ribs 52, 54 include an inner wall 65, 67 located in spaced relation to respective lip outer walls 40, 42. Thus, the ribs 52, 54 define cantilever members supported by the lip portions 32, 34 wherein the ribs 52, 54 are configured to have a characteristic natural frequency which substantially matches or is equal to the natural frequency of the lip portions 32, 34 as the lip portions 32, 34 vibrate at a frequency in the audible frequency range.

The particular natural frequency selected for the ribs 52, 54 may be controlled by selecting appropriate values for the mass (M) of the ribs 52, 54, the bending stiffness (S) of the connection of the ribs 52, 54 with the lip portions 32, 34, and the distance or length (L) of the ribs 52, 54 wherein the distance (L) is the measured length from the junction with the respective lip portions 32, 34 to the free end of the ribs 52, 54. These values are related to the natural frequency in accordance with a mathematical relationship containing the characteristic parameters M, L and S.

By selecting the values M, S and L such that the relationship between these parameters corresponds to the natural frequency of the lip portions 32, 34, the ribs 52, 54 will be formed to vibrate at the natural frequency of the lip portions 32, 34 wherein the vibrations of the ribs 52, 54 will be 180° out of phase with the lip portion vibrations. The net result of having the ribs 52, 54 vibrating out of phase with the lip portions 32, 34 is to have the vibrations of the lip portions 32, 34 and ribs 52, 54 cancel each other out to substantially eliminate any acoustical vibrations from the lip portions such that resonant rise symptoms are avoided to dampen out noise or whistling sounds from the valve.

It should be noted that although the vibration dampening means are disclosed here in the form of ribs 52, 54, the vibration dampening means may take on any form which provides a dampening body having a natural frequency of vibration which is substantially equal to and out of phase with a natural frequency of vibration for a body portion of the valve 10 in the audible range.

Further, referring to FIG. 7, the frequency waves produced by oscillation of the lip portions 32, 34 and the vibration dampening are depicted graphically and shown superimposed in which the frequency graph of the lip portions is labeled A and the frequency graph of the vibration dampening means is labeled B. It can be seen that the two frequency waves are 180° out of phase with each other and have equal but opposite amplitude such that the net sum of the two frequency waves at any given point will be zero corresponding to the elimination of noise produced by the valve.

Referring again to FIGS. 2 and 4, the width of the ribs 52, 54, as measured in a direction parallel to the slit 50 between respective lateral walls 56, 58 and 60, 62, is small and preferably less than 1/5 the width of the lip portions 32, 34, as measured in a direction parallel to the slit 50, such that the ribs 52, 54 do not interfere with the flexibility of the lip portions 32, 34 along the length of the slit 50. It should also be noted that the lip portions 32, 34 have a thickness which is less than half the width of the ribs 52, 54 such that the ribs 52, 54 form enlarged weighted elements on the lip portions 32, 34 for substantially lowering the frequency for the vibrational movement of the lip portions 32, 34.

From the above description of the anti-whistling duckbill valve of the present invention, it should be apparent that the ribs 52, 54 are specifically designed to be located on the central portion of the valve lip portions 32, 34 where the greatest opening and closing movement occurs during operation of the valve 10. Further, the weight of the ribs 52, 54 acts to decrease 4 or dampen the natural frequency of the lip portions 32, 34 in addition to the natural frequency of vibration for the ribs 52, 54 being counter to the lip vibration to eliminate whistling sounds produced by oscillating movement of the lip portions 32, 34. This dampening of the lip portions 32, 34 is accomplished without adding additional weight to the second end 22 of the lip portions 32, 34, where sealing takes place and initial vibrations start, and since this design does not create additional sealing forces at the slit 50, the dampening means operate without detrimentally affecting the flexibility of the lip portions 32, 34 to move for opening of the slit 50 to permit forward fluid flow through the valve 10.

Figure 5:
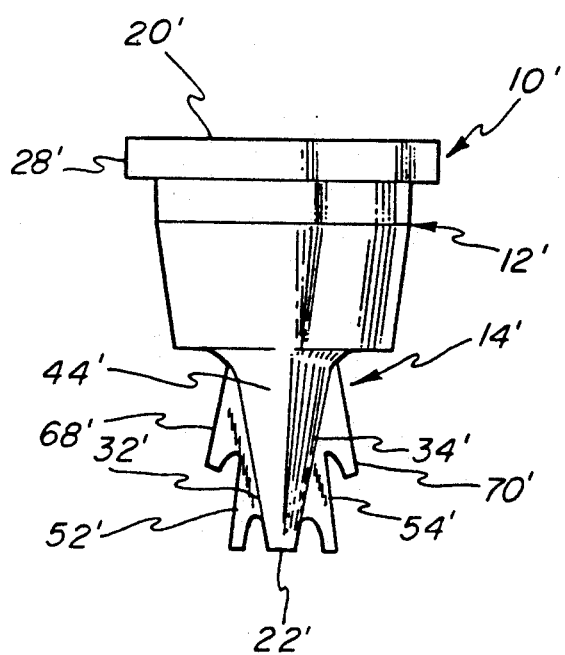
FIG. 5 shows an alternative embodiment of the valve of the present invention.

FIG. 5 illustrates a further embodiment of the present invention in which elements similar to the previous embodiment are indicated with the same number primed. The valve 10' has the same base structure 12' as in the previous embodiment. The present embodiment differs from the previous embodiment in that the regulator portion 14' is provided with third and fourth ribs 68', 70' located adjacent to the first and second ribs 52', 54', respectively, and extending from the lip portions 32', 34'.

The additional ribs 68', 70' may be used to create a preload on the lip portions 32' 34' to ensure that sealing takes place while creating a minimum of back pressure in forward flow conditions. The valve 10' shown in this embodiment may be used in combination with a housing (not shown) having walls for engaging the third and fourth ribs 68', 70' whereby the ribs 68', 70' and the lip portions 32', 34' will be biased inwardly toward each other.

Figure 6:
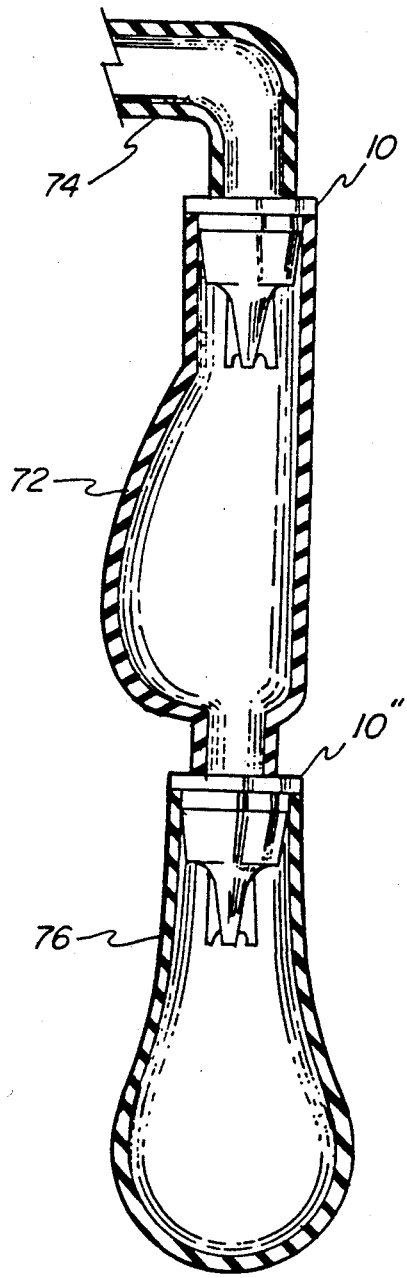
FIG. 6 is a view of the valve of the present invention in use in a medical fluid drainage system shown in cross-section.

FIG. 6 illustrates a typical use of the valve as it is incorporated into a medical wound drainage system. The system includes a manual suction device 72 for drawing fluid from a patient's wound through a suction line 74. Fluid drawn into the suction device 72 is subsequently transferred to a disposable bag 76.

During operation, the suction device 72 is squeezed and then released causing fluid form a wound to be pulled through the line 74 and past a first one-way duckbill valve 10 and connected to the line 74 and attached to the suction device 72. When the suction device 72 is subsequently squeezed, fluid within the device 72 is pushed through a second one-way duckbill valve 10 attached to a lower end of the device 72 such that the fluid is transferred into the bag 76. The duckbill valve 10, 10'' of the present invention substantially eliminates any whistling noise produced during passage of the fluid, which may be in the form of liquids and air, from the suction device 72 to the bag 76 while providing a check valve which exhibits the beneficial characteristics of conventional duckbill check valves, including opening at low pressures and providing low restriction to forward flow, as well as providing quick and positive closure during reverse flow conditions.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A valve comprising:
   a resilient valve body for controlling fluid flow;
   a vibration dampener supported on said valve body for dampening a vibrating movement of said valve body during fluid flow past said valve; and
   wherein said valve body defines a first natural frequency and said vibration dampener defines a second natural frequency related to said first natural frequency.

2. The valve of claim 1 wherein said valve body includes a base and opposing lips supported by said base and extending in converging relationship toward each other.

3. The valve of claim 2 wherein said vibration dampener comprises a rib formed on an exterior surface of each of said lips, each said rib being configured to vibrate at a natural frequency cancelling vibrations of said lips.

4. The valve of claim 3 wherein said opposing lips define a slit therebetween at one end of said valve and said ribs extend in spaced relation to said lips toward said one end of said valve.

5. A valve comprising:
   a resilient valve body for controlling fluid flow;
   a vibration dampener supported on said valve body for dampening a vibrating movement of said valve body during fluid flow past said valve; and
   wherein fluid flow through said valve causes said vibration dampener to vibrate at a natural frequency substantially equal to a frequency of vibration of said valve body created by said fluid flow.

6. The valve of claim 5 wherein said vibration dampener vibrates out of phase with the vibration of said valve body whereby the vibrations of said valve body are cancelled by the vibrations of said vibration dampener.

7. A valve comprising:
   a resilient valve body for controlling fluid flow;
   a vibration dampener supported on said valve body for dampening a vibrating movement of said valve body during fluid flow past said valve; and
   wherein said vibration dampener is formed as a resilient cantilever member having opposing outer and inner surfaces, said outer surface facing away from said valve body and said inner surface facing toward said valve body and extending in spaced relation to said valve body.

8. The valve of claim 7 wherein said resilient cantilever member has a natural frequency in accordance with a mathematical relationship containing M, L and S wherein M is the mass, S is the bending stiffness of the connection of said cantilever member with said valve body and L is the length of said cantilever member.

9. The valve of claim 8 wherein said cantilever member has a natural frequency substantially equal to a natural frequency of said valve body.

10. The valve of claim 7 wherein said outer and inner surfaces each extend longitudinally of said valve body from an upstream location adjacent to said valve body to a downstream location in spaced relation to said valve body.

11. The valve of claim 10 including opposing lateral walls extending from said upstream location to said downstream location between said outer and inner surfaces.

12. A method of controlling noise in a valve having a resilient valve body, comprising the steps of:
    supporting a vibration dampener on said valve body for dampening movement of said valve body; and
    causing a fluid to flow past said valve body to create a vibrating movement in each of said valve body and said vibration dampener wherein said vibration dampener vibrates out of phase with said valve body.

13. The method of claim 12 wherein said vibration dampener vibrates at a predetermined natural frequency regulated by the size, stiffness and mass of said vibration dampener, and said natural frequency is substantially equal and opposite to a natural frequency of said valve body.

14. The method of claim 12 wherein said vibration dampener is mounted to move in response to vibrations of said valve body whereby said vibration dampener is caused to vibrate opposite to said valve body to control noise produced by said vibrations of said valve body.

15. An anti-whistling duckbill check valve for use in a fluid flow path for permitting relatively free fluid flow in a first direction from a first end to a second end of said valve and for preventing fluid flow in a second opposite direction, said valve comprising:
    a base portion defining a longitudinal axis for said valve;

first and second lip portions supported by said base portion and extending in converging relationship toward each other, said lip portions forming a fluid flow passage through said valve;

means defining a slit at said second end of said valve and forming an opening for fluid flow out of said flow passage; and vibration dampeners located on said lip portions, each said vibration dampener including opposing outer and inner surfaces, said outer surfaces facing away from said lip portions and said inner surfaces facing toward said lip portions, and said outer and inner surfaces extending substantially parallel to said longitudinal axis from a location in contact with said lip portions at an upstream end of said vibration dampeners to a location where said outer and inner surfaces are in spaced relation to said lip portions at a downstream end of said vibration dampeners.

16. The valve of claim 15 wherein said vibration dampeners are formed as first and second ribs extending radially outwardly from outer walls of said first and second lip portions.

17. The valve of claim 16 including third and fourth elongated ribs extending radially outwardly from said first and second ribs, respectively.

18. The valve of claim 15 wherein said vibration dampeners comprise resilient cantilever members extending in spaced relation to said lip portions.

19. The valve of claim 15 wherein said vibration dampeners are configured to vibrate at a natural frequency substantially equal to and 180 degrees out of phase with a natural frequency of said lip portions to cancel out vibrations of said lip portions.

20. An anti-whistling duckbill check valve for use in a fluid flow path for permitting relatively free fluid flow in a first direction from a first end to a second end of said valve and for preventing fluid flow in a second opposite direction, said valve comprising:

a base portion defining a longitudinal axis for said valve;

first and second lip portions supported by said base portion and extending in converging relationship toward each other, said lip portions forming a fluid flow passage through said valve;

means defining a slit at said second end of said valve and forming an opening for fluid flow out of said flow passage;

vibration dampeners comprising resilient cantilever members extending from a location in contact with said lip portions at an upstream end of said vibration dampeners to a location in spaced relation to said lip portions at a downstream end of said vibration dampeners; and wherein said cantilever members are mounted to move in response to vibrations of said lip portions whereby said vibration dampeners are caused to vibrate opposite to respective ones of said lip portions to control noise produced by said lip portions.

* * * * *